Nov. 27, 1956   G. D. HARKEY, JR., ET AL   2,771,915
FLUID DELIVERY DEVICE

Filed Feb. 18, 1950   3 Sheets-Sheet 1

INVENTORS
CARSON E. HAWK
GEORGE DONALD HARKEY JR.
BY
D. Gordon Angus
ATTORNEY

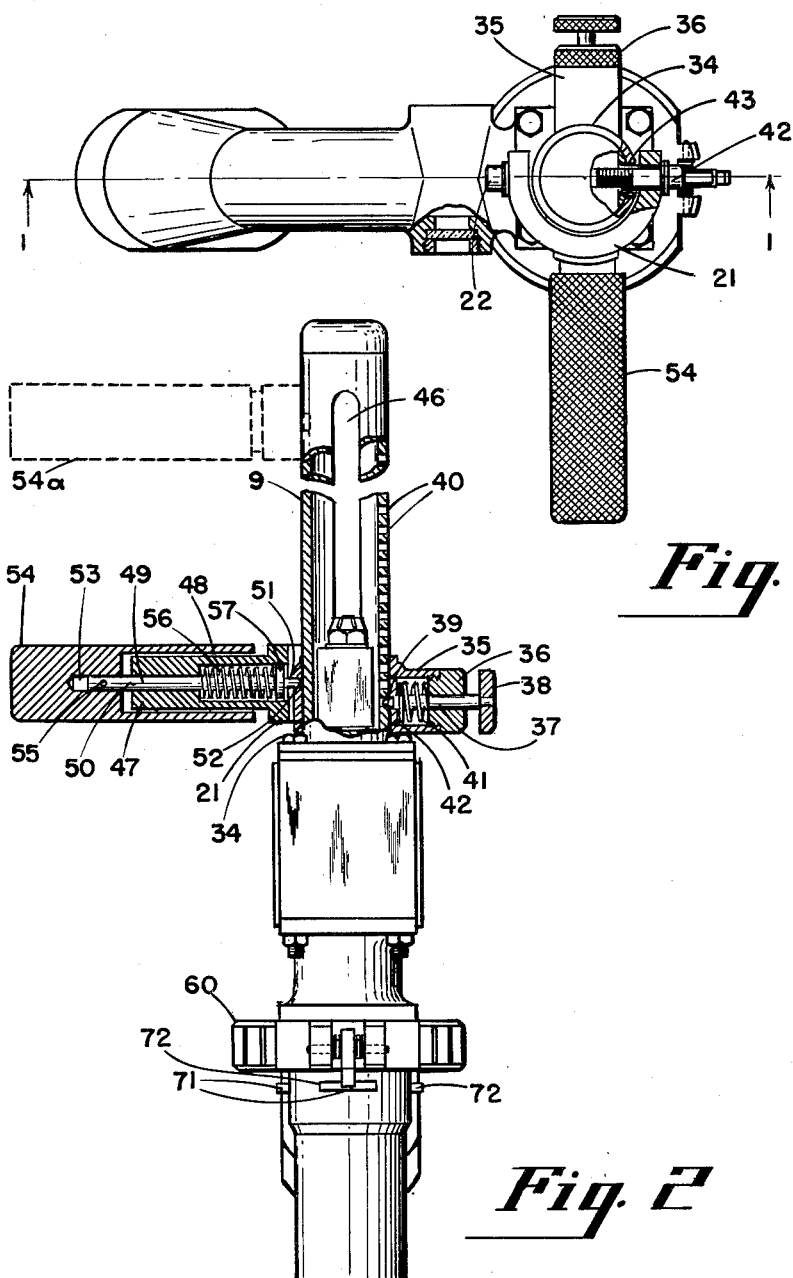

Nov. 27, 1956  G. D. HARKEY, JR., ET AL  2,771,915
FLUID DELIVERY DEVICE

Filed Feb. 18, 1950  3 Sheets-Sheet 3

INVENTORS
CARSON E. HAWK
GEORGE DONALD HARKEY JR.
BY
D. Gordon Angus
ATTORNEY

United States Patent Office 2,771,915
Patented Nov. 27, 1956

2,771,915

FLUID DELIVERY DEVICE

George Donald Harkey, Jr., Fontana, and Carson E. Hawk, Pomona, Calif., assignors, by mesne assignments, to Aerojet-General Corporation, Cincinnati, Ohio, a corporation of Ohio Application February 18, 1950, Serial No. 144,932

9 Claims. (Cl. 141—116)

This invention relates to filling systems and has for its principal object to provide a fluid delivery device or valve which can be used in a closed filling system. A related object is to provide such a filling device capable of filling a receptacle to a desired point.

It is a common practice to fill tanks and receptacles through a filling conduit forming a valve. In many cases, especially when the tank is being filled with dangerous or corrosive fluids, damage may result from the fact that some of the fluid will splash out through the vent or overflow from the tank or will leak or run out from the filling device or tank when it is removed.

In U. S. Letters Patent No. 2,401,124, issued May 28, 1946, a valve is shown which is capable of overcoming many of these difficulties. Also, in U. S. Letters Patent No. 2,515,085, issued July 11, 1950, assigned to the same assignee as the present application, there is shown another valve capable of being used in a closed system, the latter being useful in filling a tank from the bottom thereof.

In some cases, it is desired to provide a closed system which will leave the receptacle less than completely full. Liquids expand in varying degrees with changes of temperature, so that if a tank were completely filled with a liquid at a cold temperature, it would tend to expand and force its way out of a tank, or rupture the tank when it becomes warmer. It is accordingly desirable to fill a tank less full when the liquid is cold than when it is warmer.

In accordance with the present invention there is provided a filling device comprising a valve arrangement which is an improvement over the valves shown in the above-mentioned patents in that it is possible to fill a tank or receptacle to a desired degree; and if desired, the amount to which the receptacle is filled can be predetermined by ascertaining the temperature of the liquid with which it is being filled.

The foregoing objects are carried out according to the invention by the provision of a filling device provided with a charging system and an automatic venting system in a valve body, and sealed from each other. In conjunction with the aforementioned system there is provided within the valve structure, means whereby the charging and venting systems may both be simultaneously sealed so that leakage or dripping will not occur.

A feature of the invention resides in the provision of means whereby a fluid delivery outlet from the closed system is adjustable in height in the tank so as to establish the height to which the tank may be ultimately filled with a liquid.

A related feature resides in the provision of means whereby the height of the outlet opening may be preadjusted. By thus establishing the height of the outlet in accordance with the temperature of the liquid, the device may be preset in accordance with liquid temperature so that the right amount of liquid may be introduced into the tank.

The foregoing and other features and advantages of the invention will be better understood from the following detailed description and the accompanying drawings of which:

Fig. 2 is a front elevation of the device, partially in cross section;

Fig. 3 is a top view of the device;

Figure 6:
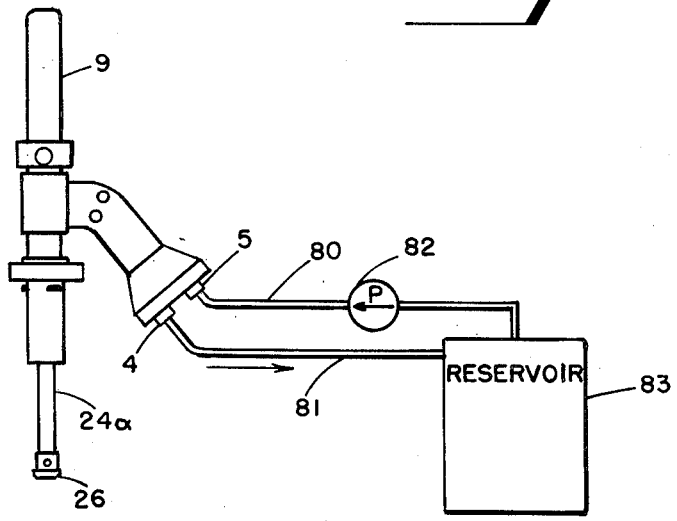
Fig. 6 is a schematic view showing the device connected to a pump and reservoir.

The filling device shown in the drawing comprises a body portion 1 containing passageways 2 and 3 leading from threaded couplings 4 and 5, respectively, to the housing member 6. The couplings 4 and 5 are adapted to connect with conduits from a fluid supply tank, as shown in Fig. 6. The body 1 comprises, in addition to the two passageways 2 and 3, a housing member 6, to the lower end of which there is fastened a tubular sleeve 7 by bolts 8; and extending upwardly from housing 6 in the opposite direction is fastened a tubular member 9, this being fastened by bolts 10 to the flange 11 of a sleeve member 12. The member 12 has a depending sleeve 13 leaving an annular space 14 between it and the sleeve 7. At the region between the inlet of passageways 2 and 3 to the housing 6, the circumference of member 12 is brought out at 15 to engage with the internal wall of chamber 6 and sealed to the wall by a sealing ring 16.

There is located within the sleeve 13 a retractable rod or plunger 18 leaving an annular space 19 between the wall of the plunger and the inner wall of the sleeve 13; and at its upper end the plunger 18 is held in a fitting 20 supported from a yoke 21 by means of machine screws 22, in a manner to be described hereinafter. The main part of the plunger 23 is solid, and the lower end thereof is hollowed or bored out at 24 to provide a hollow conduit to several openings 25 through the wall 24a, the lower end of the hollow conduit 24 being provided with a plug 26 just below the openings 25.

The plunger 18 is adapted to slide lengthwise up and down within the sleeve 13; and to prevent leakage of fluid between passageways 14 and 19, the hollow tube portion 24 is provided with a sealing ring 27 below the openings 28 which provide communication between passageway 24 and the annular passageway 19. The annular passageway 19 is in communication with the inlet passageway 3 through openings 29; and to prevent leakage from this region upwardly through the housing, the member 12 is provided with annular sealing rings 30.

When the plunger 18 is in its uppermost position, the hollow conduit 24 is substantially entirely within the housing 7; andn when in this position leakage from passageway 14 is prevented by means of a sealing ring 31 around the plug 26 which engages in an annular seat 32 inside the lower edge of collar 33 located at the lower end of tubular member 7. This position of plug 26 is shown by dotted lines 26a.

Figs. 2 and 3 show the yoke 21 which supports the top of plunger 18 placed around a ring member 34, which is slidable along the outside of tube 9. At one side thereof, ring 34 has built on it a hollow cylindrical protuberance 35 which terminates in a plug 36 threaded into its end; and through a central hole through this plug there is placed a pin 37 attached to a handle 38, the pin being slidable through the plug and provided at its end with a conical or somewhat rounded point 39 adapted to engage the point of the pin from one of the holes 40 the the member 9. Within the hollow of member 35 there is placed a compression spring 41 compressed between the plug and a disk 42 fastened on the pin so as to urge the point of the pin into the adjacent hole. Thus to disengage the point of the pin from one of the holes 40 the handle 38 can be pulled outwardly; whereupon the ring member 34 may be slid up and down on the tube 9 thereby allowing the point of the pin to engage in any hole of the vertical column of holes 40.

The yoke 21 extends around the side of ring member 34 which is opposite from the cylindrical protuberance 35; and to make room for the machine screws 22 which go through the ends of the yoke and into the member 20 within tube 9, the ring member is provided with a pair of opposite cutouts 43 and 44 beginning just below the lowermost machine screw and extending vertically to the top of the ring. At the same position the tubular member 9 is provided with a pair of oppositely located vertical slots 45 and 46 beginning where the lower ends of openings 43 and 44 begin and extending upwardly almost to the top of tube 9. These elongated vertical slots 45 and 46 provide space for the machine screws 22 so that the yoke 21 can be moved up and down vertically for the full length of these slots.

Figure 1:
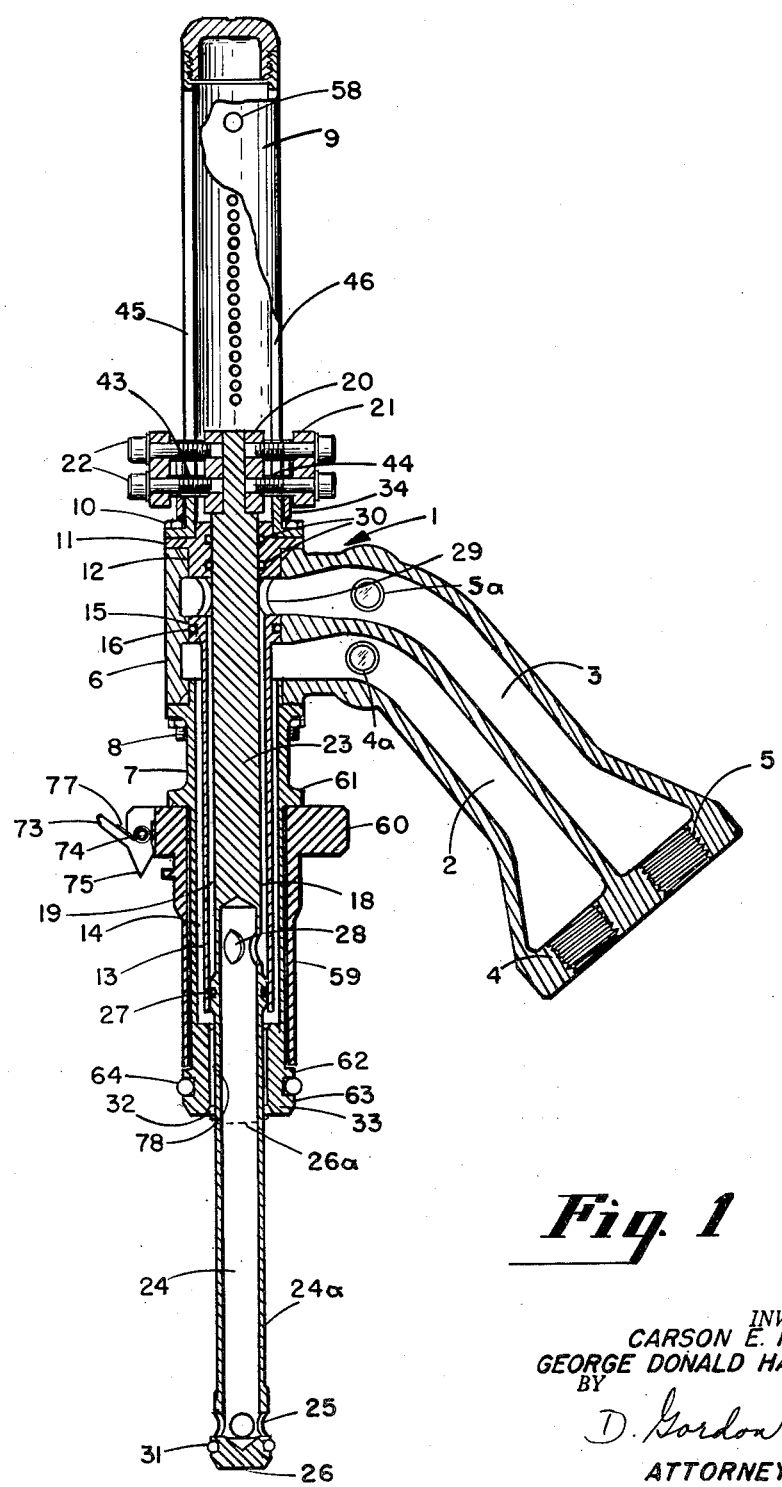
Fig. 1 is a cross section view in elevation of a filling device, in accordance with this invention, taken on the line 1—1 of Fig. 3.

The yoke 21 is adapted to be fixed in one of two positions, namely, an upper and a lower position. The position shown in Figs. 1 and 2 is the lower position. To provide for thus fixing the yoke in one or the other of these positions, the yoke is provided with a protruding handle 47 having an inner bore 48 and a hole 49 extending the rest of the way through the handle into the bore. A pin 50 is placed through the hole 49 and the inner point 51 of the pin is adapted to engage in a hole 52 in the circumference of the ring member 34 opposite the position of its handle 38. The opposite protruding end of the pin 50 is fitted into a hole 53 in a manual grasping member 54 and fastened by a suitable pin or fastening means 55. A compression spring 56 is set within the bore 48 between the outer end of the bore and a disk 57 fastened to the pin, so that the pin is normally held engaged in the hole 52 by the spring, but may be withdrawn from the hole by pulling out on the manual grasping handle 55 against the compression of the spring. When the pin is thus withdrawn from the hole the yoke may be moved upward and if desired, the pin may be inserted in its upper position by allowing the pin point to engage in a hole 58 near the top of the member 9. This position is indicated by the dotted lines 54a in Fig. 2.

Figure 5:
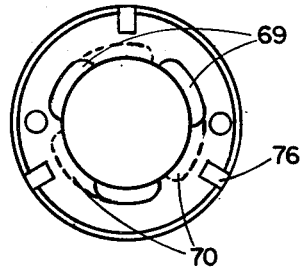
Fig. 5 is a view looking into the mouth of a container into which the delivery end of the device is to be inserted.

For fitting the filling device to the container or tank to be filled there is fitted around the sleeve 7, a sleeve member 59 provided with a flange 60, the upper surface of which is in engagement with the lower surface of a shoulder 61 on sleeve 7. The lower end of sleeve member 59 abuts against a shoulder 62 of member 33, said shoulder 62 cooperating with a shoulder 63 to retain an O ring 64 adapted to extend down into and engage with the neck 65 within the container 66. The neck 65 is threaded to a boss 68 protruding from the top of container 66. To secure the device to the container, the top of the neck of the container is provided with a number of cutouts 69 spaced around the inner periphery as shown in Fig. 5; and also with a number of undercut recesses 70 located between adjacent cutouts 69 and communicating with the cutouts. This neck construction is adapted to receive a corresponding number of horizontally positioned tongues 71 the outer edges of which will fit nicely through the cutouts 69 and the upper edges 72 of which will fit under the undercut portions 70. Thus, to fit the filler into the neck the tongues 71 will be passed down into the cutouts 69; then the flange will be turned angularly through a number of degrees until the edges 72 reach a position beneath the undercuts 70 which will hold the filler against retraction. When this locked position is reached, a latch handle 73 can be rotated on a pivot 74 to bring a lock 75 into engagement with one of the registration slots 76 which will hold the nozzle against the lateral turning. A suitable snap spring 77 can serve to hold the latch in its latched position until it is again manually retracted; whereupon the flange 60 can be turned sufficiently to disengage it and withdraw it from the neck of the container.

Figure 4:
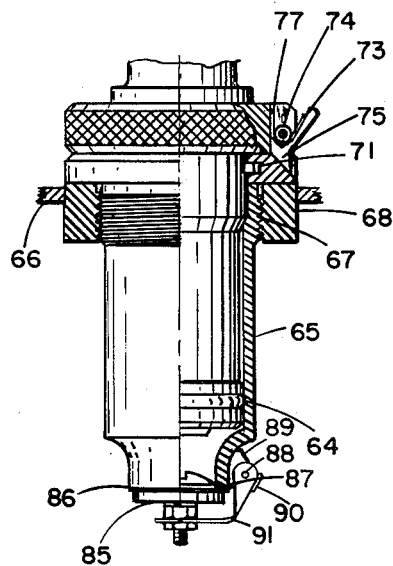
Fig. 4 is a cross section view showing a detail of the attaching means of the device.

The particular form of neck 65, shown in Fig. 4, is preferably provided with a safety cap 85 which fits over the end 86 of the neck. The safety cap is provided with a seat 87 which contacts the seat provided at the lower end of neck 65. The lower portion of neck 65 is preferably smaller in diameter than the principal portion of the neck which receives the O ring 64, however, neck 65 may be made straight throughout its entire length if desired. Safety cap 85 is provided with a supporting member 91 connected by a pin 88 to a projection 89. Projection 89 extends outwardly from the side of the reduced portion of the neck 65. Seat 87 is kept in contact with the corresponding seat on end 86 of neck 65 by means of a spring 90 which exerts pressure against the supporting member 91. This arrangement prevents any vapor from escaping from the tank when its plug is removed to permit the filler device to be inserted in the neck member 65. The projecting end 26 of the filling device pushes against cap 85 when the device is opened forcing safety cap 85 open, thereby permitting the projecting end to enter the tank 66. When the device is retracted the cap again contacts the seat provided in the end of neck 65.

To fill a container by use of the filler device of this invention, the lower protruding end of the device will be fitted into the container in the manner just described. It should be understood, however, that this particular fitting construction is not essential to the construction and operation of the device itself, as other types of fittings might, of course, be used instead.

The respective pipes or tubes 80 and 81 of a closed pumping system containing a pump 82 for pumping from a reservoir 83, will be connected at the respective attachment threads 4 and 5, as shown schematically in Fig. 6; and the fluid will be pumped into the tank through passageway 3 in the direction shown by the arrow. A pumping system of this character is disclosed in said Patent No. 2,401,124. The fluid passes then through openings 29, through annular passageway 19, through holes 28, through conduit 24, and out into the tank through openings 25. When the level of the liquid in the tank reaches the opening 86 of the neck 65, the liquid will then be forced up through annular passageway 78 and annular passageway 14 into passageway 2, where it will be returned to the pumping system in the direction of the arrow. When this condition of circulation into and out of the container is reached, the flow of liquid will be observed through sight glasses 4a and 5a; the pump will be reversed and some liquid will be pumped out of the container through passageway 3 in the direction opposite that shown by the arrows. Thus, the level of the liquid in the tank will be brought down until it reaches openings 25 whereupon no more liquid can be pumped out since opening 25 will then be just above the level of the liquid. When this condition is reached, the pumping will be stopped and the delivery member 24a retracted to its uppermost position (indicated by dotted lines 26a in Fig. 1) which will produce sealing at ring 31 in seat 32; whereupon the device can then be removed from the tank. When the plunger is thus retracted, the openings 25 are in communication with spaces 78 and 14 so that any continued pumping would simply circulate the fluid through the device.

Since the final level of the liquid in the tank atfer the reverse pumping operation has been completed will depend on the level of openings 25 in the tank, it will be apparent that adjustment of the level of the openings 25 will establish the ultimate level of the fluid in the tank. Adjustment of this level is made by setting the pin 37 into the desired one of the holes 40. If the pin 37 be inserted in the uppermost hole 40, the tank will be filled practically to the top, but if the pin 37 be inserted in the lowermost hole, it will be apparent that the tank will be considerably less filled. A particular advantage of the invention is that it enables a tank to be filled in accordance with the temperature of the liquid by which it is being filled. To take advantage of this, data can be taken with respect to the particular liquid with which the tank is to be filled to determine its temperature expansion characteristics. This could be done, for example, by filling the tank practically to the top while the liquid is at the highest temperature which could be reached while it is in the tank, and then observing the drop in level in the tank at gradations of reduced temperatures. Since the outlets 25 are to be just at the top of the fluid level at the different temperatures, it follows that there will be a hole 40 corresponding to the different temperatures within the temperature range of the liquid. It will be convenient to mark these temperatures next to each corresponding hole 40. Then all the operator will need to do will be to take a temperature reading of the liquid before he pumps it into the tank and set the pin 27 at the hole corresponding to this temperature. Then by pumping and reverse pumping through the valve as explained above, the tank will automatically be filled to the proper level so that even if the temperature of the liquid should raise to the maximum possible temperature it still would not tend to overflow or pressurize or bubble out.

Before inserting the filler into the neck of the container the pin 49 will be set into the upper hole 58 at all times so that the hollow plunger member 24a will be completely retracted and the bottom of the nozzle will be sealed against leakage. Then when the nozzle has been properly fastened to the tank, the pin 49 can be inserted in the lower hole in the position shown in Fig. 2 so that the plunger will be extended; and the ultimate length of extension of the plunger 24a will then depend on the particular one of the holes 40 in which pin 37 is inserted.

It will be apparent that by the present invention there is provided an efficient nozzle filler device which is easily inserted into the opening of a tank to be filled and connected in such a manner as to create a closed pump system. Such a nozzle device permits filling with highly dangerous fluid without endangering the operator or equipment, because of the effective sealing system. A particular advantage is the ability to fill to desired levels short of the top of the tank.

Another advantage of our device is that it permits the operation to be conducted in a closed system which prevents the escape of any fumes.

A further advantage is that no dip stick is necessary to set the level of the liquid in the tank since this is done automatically by setting the position of the return in the nozzle filler device.

We claim:

1. A fluid delivery device for supplying fluid to a container, said device comprising a first sleeve, and a second sleeve located within the first sleeve and providing a first annular space between said sleeves, a delivery plunger within the second sleeve with a second annular space between the plunger and the second sleeve, said plunger being slidable within the second sleeve and having a fluid conducting conduit at its lower end, communicating means between the second annular space and said conduit, an outlet from approximately the lower end of said conduit for delivery into the container, an inlet passageway communicating with said second annular space, an outlet passageway communicating with the first annular space, and means for protruding said plunger from said second sleeve so that said outlet is exposed to deliver fluid into the container.

2. A fluid delivery device according to claim 1 in which the means for protruding said plunger comprises a registration pin associated with the plunger and a plurality of registration holes engageable by the pin, whereby registration in different holes changes the protrusion of the plunger.

3. A fluid delivery device according to claim 2 in which said means for protruding said plunger comprises a yoke attached to the plunger, and said registration pin is attached to a handle of said yoke.

4. A fluid delivery device according to claim 3 in which the handle comprises a cylinder attached to the yoke with a retractable pin axially through the cylindrical handle slidable over the cylinder into which the pin is attached.

5. A fluid delivery device for supplying fluid to a container, said device comprising a housing, an inlet passageway and an outlet passageway connected with the housing, a pair of concentric sleeves connected with the housing with a first annular space between the sleeves, a retractable plunger within the inner sleeve with a second annular space between the plunger and the inner sleeve, communicating means between the inlet passageway and one of the annular spaces, communicating means between the outlet passageway and the other of the annular spaces, the plunger having a fluid conducting conduit with a delivery outlet near its lower end, and one of the annular spaces having an exit opening at its lower end, sealing means below said outlet for sealing up the exit opening when the plunger is retracted, a plunger supporting device, registration means attached to the housing and having registration holes engageable by the plunger supporting device for adjusting the maximum possible protrusion of the plunger and means for retracting and protruding the plunger.

6. A fluid delivery device according to claim 5 in which the delivery outlet lies within said last-mentioned annular space when the plunger is retracted, thereby allowing fluid circulation through the device without leakage out of the device.

7. A fluid delivery device according to claim 5 in which the registration means comprises a hollow tubular member extending upward along the longitudinal axis of the device, and said registration holes are vertically aligned in the outer wall of said tubular member, and the plunger supporting device has a retractable pin which engages different ones of said registration holes to establish the maximum protrusion of the plunger.

8. A fluid delivery device for supplying fluid to a container, said device comprising a housing with a fluid inlet passageway and a fluid outlet passageway, a pair of concentric sleeves, and a concentric plunger within the inner sleeve, there being an outer annular space between the inner and outer sleeves and an inner annular space between the inner sleeve and the plunger, communicating means between the inlet passageway and the inner annular space and communicating means between the outlet passageway and the outer annular space, the lower end of the plunger having a fluid passageway with communicating means to the inner annular space, and an outlet for filling the container at the lower end of said conduit, the plunger being slidable lengthwise within the inner sleeve to protrude into the container and expose the outlet, and being retractable to withdraw the outlet within the outer annular space, sealing means for sealing the outer annular space against leakage below said outlet, a hollow cylindrical member containing a vertical column of indentations extending from the housing in the direction opposite the direction of protrusion of the plunger, a collar means around said cylinder and slidable lengthwise over the cylinder and having a registration pin for engagement in any of the indentations, a yoke means extending at least partially around the cylinder and the collar, fastening means attached to the yoke means and to the retractable plunger, said collar having a stop against which the attaching means rests to establish maximum protrusion of the plunger whereby the maximum plunger protrusion is dependent on the registration of said registration pin with the registration means, said yoke being movable vertically relative to the cylinder and collar to retract and protrude the plunger.

9. A fluid delivery device according to claim 8 in which the cylinder has longitudinally extending openings through which fastening means from the yoke to the plunger extend.

References Cited in the file of this patent

UNITED STATES PATENTS 1,170,672  Rice et al. _____ Feb. 8, 1916